(12) United States Patent
Maeda et al.

(10) Patent No.: US 8,480,305 B2
(45) Date of Patent: Jul. 9, 2013

(54) RESIN CAGE FOR ANGULAR CONTACT BALL BEARING

(75) Inventors: Masaki Maeda, Nisshin (JP); Tsuyoshi Okumura, Yamatokoriyama (JP); Hiroshi Yano, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 0 days.

(21) Appl. No.: 13/322,693

(22) PCT Filed: Jun. 21, 2010

(86) PCT No.: PCT/JP2010/060475
§ 371 (c)(1),
(2), (4) Date: Nov. 28, 2011

(87) PCT Pub. No.: WO2011/001844
PCT Pub. Date: Jan. 6, 2011

(65) Prior Publication Data
US 2012/0087612 A1 Apr. 12, 2012

(30) Foreign Application Priority Data

Jun. 29, 2009 (JP) .................................. 2009-153377
May 26, 2010 (JP) .................................. 2010-120154

(51) Int. Cl.
*F16C 33/38* (2006.01)
(52) U.S. Cl.
USPC ............ 384/527; 384/523; 384/534; 384/614
(58) Field of Classification Search
USPC ................. 384/470, 523, 526–527, 532, 531, 384/534, 614, 623
See application file for complete search history.

(56) References Cited

U.S. PATENT DOCUMENTS

| 1,814,993 A | * | 7/1931 | Wickland ....................... 384/531 |
| 2,407,388 A | * | 9/1946 | Smith et al. ................... 384/534 |
| 3,157,443 A | * | 11/1964 | Draudt .......................... 384/527 |

(Continued)

FOREIGN PATENT DOCUMENTS

| EP | 2 034 202 A2 | 3/2009 |
| JP | A-9-196067 | 7/1997 |
| JP | A-10-103359 | 4/1998 |
| JP | 2006112595 A * | 4/2006 |

(Continued)

OTHER PUBLICATIONS

International Search Report issued in International Application No. PCT/JP2010/060475 dated Jul. 20, 2010.

*Primary Examiner* — Marcus Charles
(74) *Attorney, Agent, or Firm* — Oliff & Berridge, PLC

(57) ABSTRACT

A cage has a ring portion, and a plurality of column portions that protrude from the ring portion, that are arranged in the circumference direction. Each column portion has a column portion radially inward section that forms a bearing-radial-direction inward side portion, and a column portion radially outward section that is connected to the radially inward section at its radially outer end position, so as to protrude on both sides in the circumferential direction from the radially inward section. A connection position at which the radially outward section is connected to the radially inward section is adjusted to a position radially outward of a pitch circle position of the plurality of balls that are held in the respective pockets. Thus, the thickness of the radially inward section at the connection position is larger than the thickness of the radially inward section at the pitch circle position.

4 Claims, 4 Drawing Sheets

U.S. PATENT DOCUMENTS

| | | | | |
|---|---|---|---|---|
| 4,019,790 | A * | 4/1977 | Earsley et al. | 384/526 |
| 4,330,160 | A * | 5/1982 | Stolz et al. | 384/531 |
| 4,702,627 | A * | 10/1987 | Pollastro | 384/614 |
| 4,938,613 | A * | 7/1990 | Griffin et al. | 384/527 |
| 5,035,520 | A * | 7/1991 | Valette | 384/526 |
| 5,575,569 | A * | 11/1996 | Shinohara | 384/470 |
| 6,397,471 | B1 * | 6/2002 | Okuno | 29/898.064 |
| 2009/0074341 | A1 | 3/2009 | Takada et al. | |

FOREIGN PATENT DOCUMENTS

| | | | |
|---|---|---|---|
| JP | 2006170276 A * | 6/2006 | |
| JP | 2007333187 A * | 12/2007 | |
| JP | A-2008-115981 | 5/2008 | |
| JP | A-2009-14205 | 1/2009 | |
| JP | A-2009-74683 | 4/2009 | |
| JP | 2009144900 A * | 7/2009 | |

\* cited by examiner

RESIN CAGE FOR ANGULAR CONTACT BALL BEARING

TECHNICAL FIELD

The invention relates to a resin cage for an angular contact ball bearing.

BACKGROUND ART

It has been desired that the load carrying capacity of angular contact ball bearings, especially those for use in automobiles, be increased without increasing their sizes. In angular contact ball bearings, balls are held by a resin crown-type cage to be disposed between an inner ring and an outer ring. To increase the load carrying capacity of the bearing, increasing the number of balls which are installed in the cage is effective.

A commonly-used resin crown-type cage for an angular contact ball bearing is formed of a ring portion and a plurality of column portions that protrude from the ring portion in the axial direction and that are arranged in the circumference direction. The column portions next to each other in the circumference direction form pockets that house balls serving as rolling elements. The inner surface of each pocket is formed in a spherical shape so that rotation of the ball is not hindered. To avoid dropping of the ball that is installed in the cage at the time of bearing assembly, each column portion has a column portion radially inward section that forms a bearing-radial-direction inward side portion of the column portion, and a column portion radially outward section (serving as a ball dropping prevention portion for preventing the ball in the pocket from dropping) that is connected to the column portion radially inward section at its radially outer end position, so as to protrude on both sides in the circumferential direction from the column portion radially inward section.

In actual injection molding, a split mold that is opened in the axial direction of the cage is used. In this case, so-called "forcible removal" is performed, that is, the resin is elastically deformed during demolding and the cage is taken out of the mold, in order to form the column portion radially outward section that serves as the ball dropping prevention portion, according to Patent Document 2. The column portion radially outward section has a T-shape so as to protrude on both sides from the thin column portion radially inward section in the thickness direction thereof. Therefore, to perform the forcible removal, a parting line of the split mold need to be set at the position at which the column portion radially outward section is connected to the column portion radially inward section. Patent Documents 1 and 2 each describe a crown-type cage formed by the split mold having the parting line that is set to coincide with the pitch circle position of the row of the balls to be held by the cage.

PRIOR ART DOCUMENT

Patent Document

Patent Document 1: Japanese Patent Application Publication No. 2008-115981
Patent Document 2: Japanese Patent Application Publication No. 10-103359

BRIEF SUMMARY OF THE INVENTION

Problems to be Solved by the Invention

The interval between the balls that are held by the cage and that are next to each other in the circumference direction is shortest at the pitch circle position. Accordingly, the thickness of the column portion radially inward section of the cage, which separate balls, arranged next to each other, from each other, is also smallest at the pitch circle position. However, if the parting line of the mold coincides with the pitch circle position as described in the Patent Documents 1 and 2, the column portion radially inward section is connected at its thinnest portion to the column portion radially outward section. This may cause a problem that it is not possible to ensure the mechanical strength when the forcible removal described above is performed. According to a study by inventor, it is necessary to ensure a thickness of 0.6 mm or more at the thinnest portion of the connection position in order to secure the mechanical strength of the column portion. However, increasing the thickness at the thinnest portion means limiting the number of balls that can be held with the same pitch circle diameter (PCD), which may cause a problem that it is difficult to increase the load carrying capacity.

It is an object of the invention to provide a resin cage for an angular contact ball bearing, which is able to hold more balls with the same ball pitch circle diameter and in which the mechanical strength of the column portions is sufficiently ensured.

Means for Solving the Invention

The invention relates to a resin crown-type cage that rollably holds a plurality of balls, serving as rolling elements of the angular contact ball bearing, between an inner ring and an outer ring at predetermined intervals. In order to solve the above-described problem, the resin crown-type cage includes a ring portion, and a plurality of column portions that protrude from the ring portion in the axial direction and that are arranged in the circumference direction, wherein the column portions next to each other in the circumference direction form pockets that house the balls serving as the rolling elements. Each of the column portions has a column portion radially inward section that forms a bearing-radial-direction inward side portion of the column portion, and a column portion radially outward section that is connected to the column portion radially inward section at its radially outer end position, so as to protrude on both sides in the circumferential direction from the column portion radially inward section. An inner surface of each of the pockets is formed in a spherical shape that lies astride the column portion radially inward section and the column portion radially outward section. A connection position at which the column portion radially outward section is connected to the column portion radially inward section is adjusted to a position radially outward of a pitch circle of the plurality of the balls that are held in the respective pockets so that the thickness of the column portion radially inward section at the connection position is larger than the thickness of the column portion radially inward section at the pitch circle position.

Effects of the Invention

With the resin cage for an angular contact ball bearing according to the invention, it is possible to provide the resin cage for an angular contact ball bearing, which is able to hold more balls with the same ball pitch circle diameter and in which the mechanical strength of the column portions is sufficiently ensured.

DETAILED DESCRIPTION OF THE INVENTION

Modes for Carrying out the Invention

Hereinafter, an embodiment of the invention will be described with reference to the drawings.

First Embodiment

Figure 1:
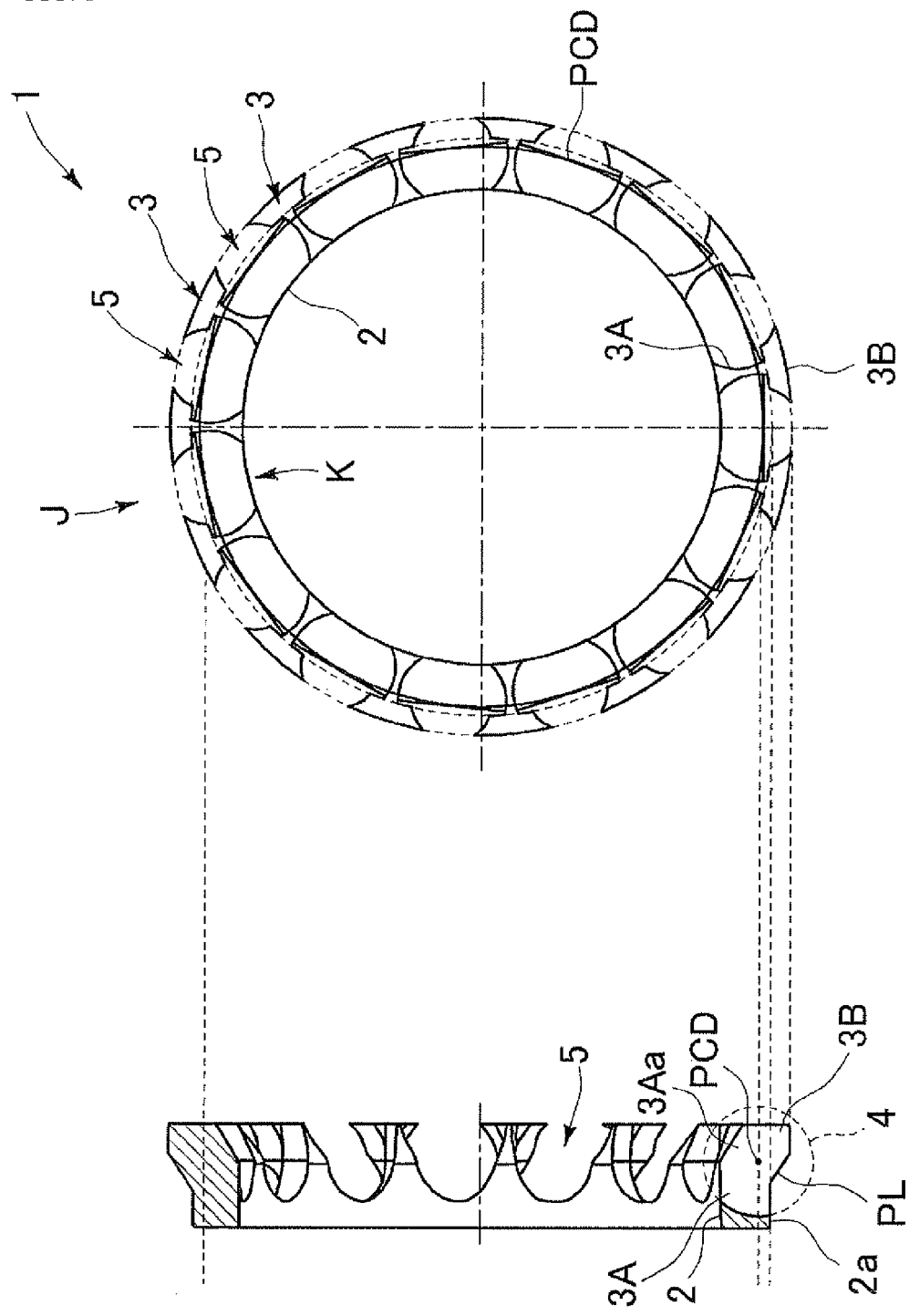
FIG. 1 illustrates a plain view and a side cross-sectional view of a resin cage for an angular contact ball bearing according to an embodiment of the invention.

FIG. 1 shows a resin cage for an angular contact ball bearing (hereinafter, may simply be referred to as "cage") 1 according to an embodiment of the invention. The cage 1 has a ring portion 2, and a plurality of column portions 3 which are arranged in the circumference direction so as to protrude from the ring portion 2 in the axial direction. The column portions 3 next each other in the circumference direction form pockets 5 which house balls 4 that serve as rolling elements. Each column portion 3 has a column portion radially inward section 3A that forms a bearing-radial-direction inward side portion of the column portion 3, and a column portion radially outward section 3B that is connected to the column portion radially inward section 3A at its radially outer end position, so as to protrude on both sides in the circumferential direction from the column portion radially inward section 3A.

Figure 4A:
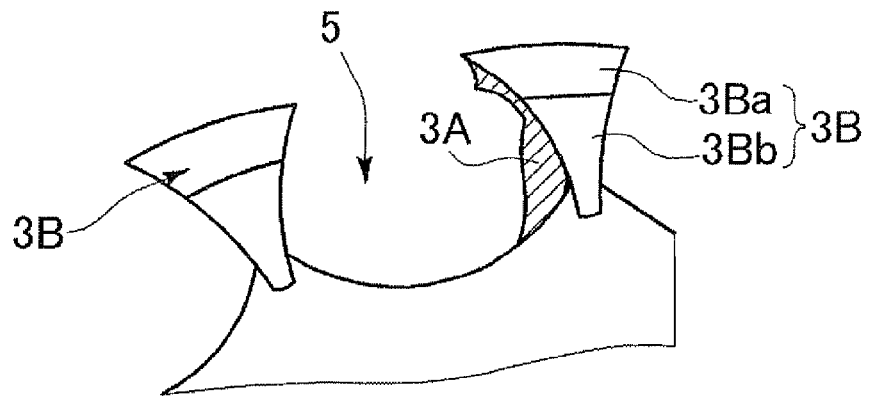
FIG. 4A is a one-side sectional view showing an example of the angular contact ball bearing when the cage in FIG. 1 is viewed from a direction J.
Figure 4B:
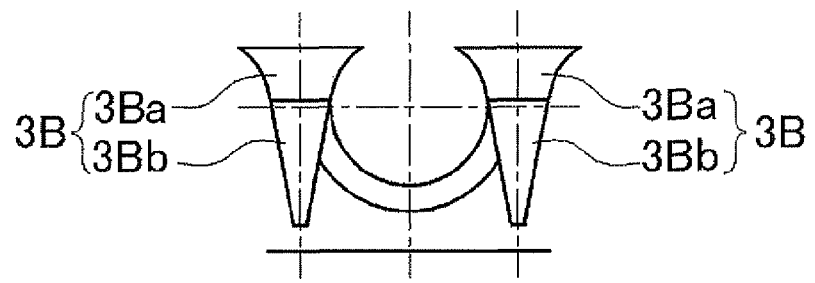
FIG. 4B is an arrow view showing an example of the angular contact ball bearing when the cage in FIG. 1 is viewed from the direction J.

As shown in FIGS. 4A and 4B, the column portion radially outward section 3B has a wide-end portion 3Ba, and a rib portion 3Bb of which the width dimension and height dimension gradually decrease from the wide-end portion 3Ba toward the column portion base end and which creates a step with the column portion radially inward section 3A. When viewed from the radially outer side (as viewed in the direction of an arrow J in FIG. 1), the wide-end portion 3Ba is in a trapezoidal shape of which the width gradually decreases toward the column portion base end and both sides of which are in an arc-shape. The radially outer surface of the wide-end portion 3Ba is a cylindrical surface with the constant diameter throughout its length in the axial direction.

Figure 3A:
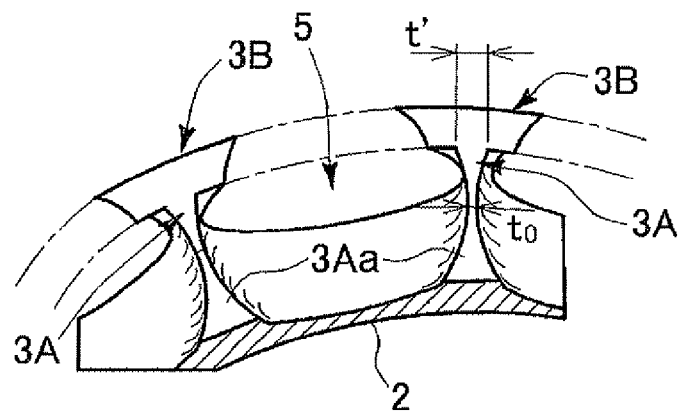
FIG. 3A is a one-side sectional view showing an example of an angular contact ball bearing when the cage in FIG. 1 is viewed from a direction K.
Figure 3B:
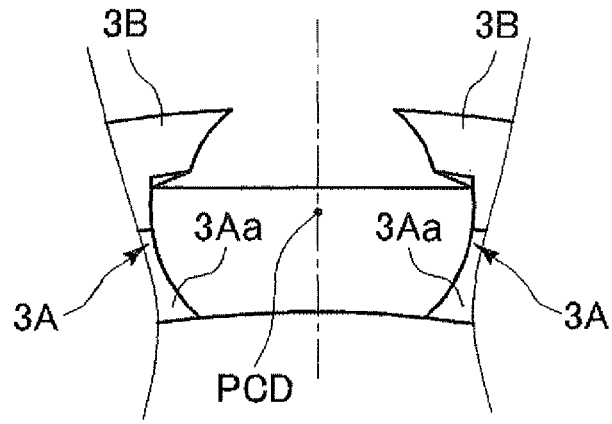
FIG. 3B is an arrow view showing an example of the angular contact ball bearing when the cage in FIG. 1 is viewed from the direction K.

Next, as shown in FIGS. 3A and 3B, a column portion distal end-side section 3Aa of the column portion radially inward section 3A has a tapered cross section of which the width gradually decreases toward the distal end of the column portion, and is connected to the column portion radially outward section 3B with a step. Then, the inner surface of the pocket 5 is formed in a spherical shape that lies astride the column portion radially inward section 3A and the column portion radially outward section 3B. As shown in FIG. 1, the position at which the column portion radially outward section 3B is connected to the column portion radially inward section 3A is adjusted to a position radially outward of the pitch circle position of the plurality of balls 4 held in the respective pockets 5.

Figure 2:
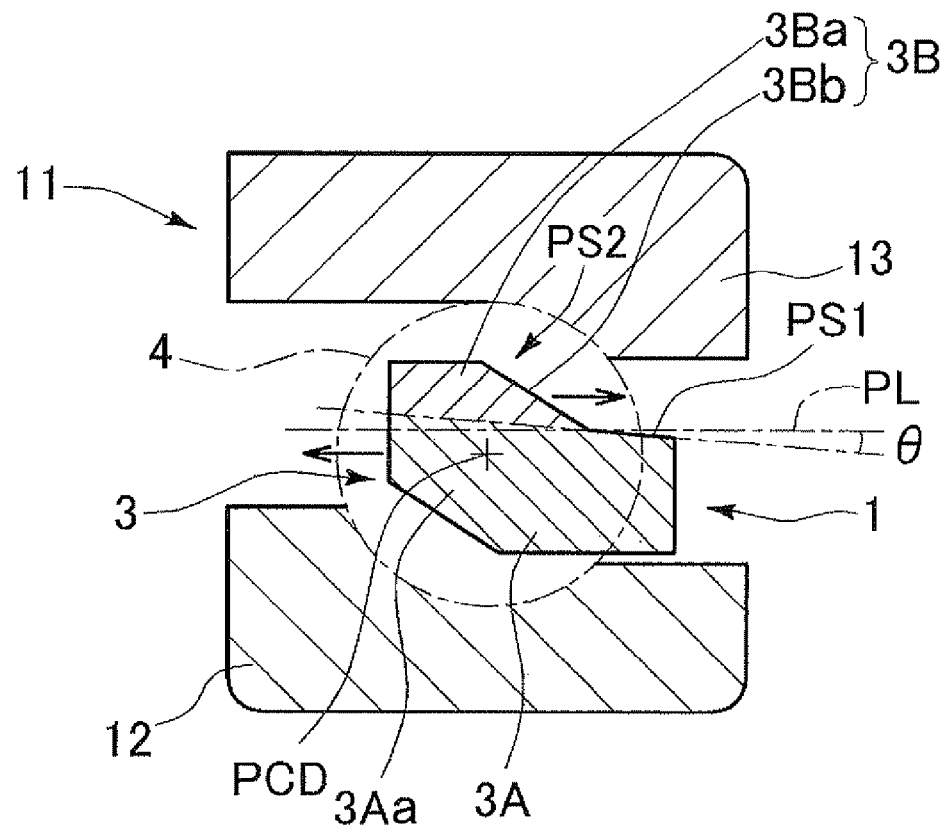
FIG. 2 is a half sectional view showing an example of the structure of a bearing in which the cage in FIG. 1 is used.

FIG. 2 shows an example of an angular contact ball bearing in which the cage 1 is used. In the bearing 11, the cage 1 holding the balls 4 is fitted to an outer ring 13, and then a double-row inner ring 12 is fitted. FIG. 2 shows a single row angular contact ball bearing, but the bearing 11 may be a double row angular contact ball bearing.

Figure 6:
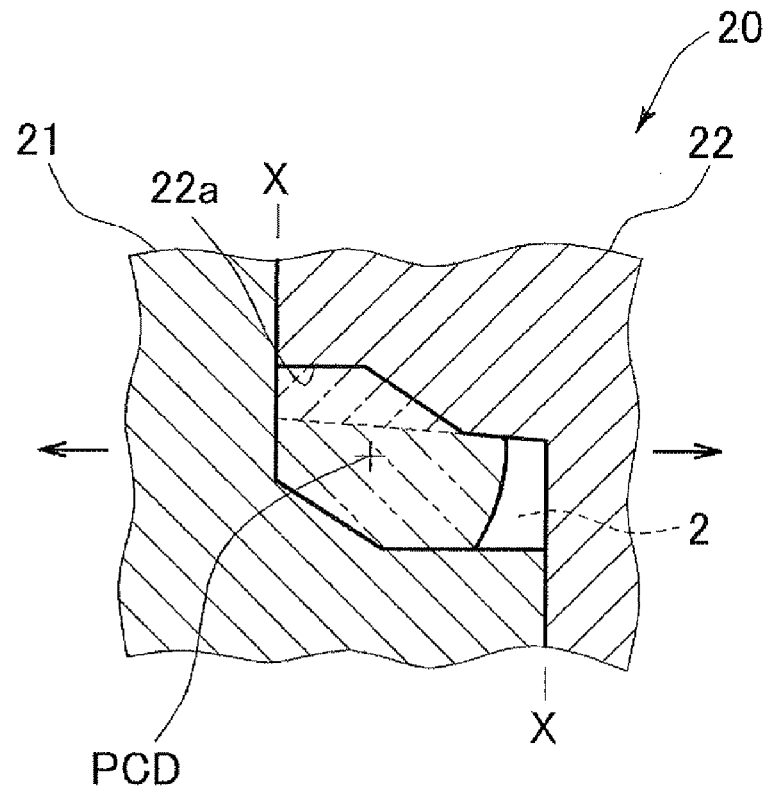
FIG. 6 is a view illustrating a mold used to form the cage in FIG. 1.

As shown in FIG. 2 and FIG. 6, resin molding of the cage 1 is performed using a mold 20 that includes a first mold 21 located, when the mold is closed, on the inner side in the radial direction of the cage 1 and used to form a portion including the column portion radially inward section 3A and the ring portion 2, and a second mold 22 located, when the mold is closed, on the outer side in the radial direction of the cage 1 and used to form the column portion radially outward section 3B. After molding, the molds 21 and 22 are opened in opposite axial directions as shown by the arrows.

Here, opening of the mold 20 will be described. With the first mold 21 and the second mold 22 closed, resin is injected into these molds through a gate (not shown). The first mold 21 and the second mold 22 may be split from each other at the mold split surface indicated by X in the drawing, and the radially outer surface of the wide-end portion 3Ba of the cage 1 is formed by an inner peripheral surface 22a of the second mold 22. After the resin is injected, the cage 1 is taken out by opening the first mold 21 and the second mold 22 in opposite axial directions of the cage 1 as shown by the arrows. Accordingly, it is possible to smoothly open the molds.

In the embodiment, the ring portion 2 and the column portion radially outward section 3B form a first end-side portion PS1 of the radially outer peripheral surface of the column portion 3, at which the ring portion 2 is located in the axial direction, and the column radially outward section 3B that protrudes radially outward from the first end-side portion PS1 forms a second end-side portion PS2 that is the remaining section of the outer peripheral surface (see FIG. 2). Then, a parting surface PL of the split mold used to form the cage 1 is set to a position radially outward of the pitch circle position such that the parting surface PL is a tapered surface the diameter of which is smaller on the side on which the ring portion 2 is located than on the opposite side, and such that the parting surface PL covers the first end-side portion PS1 and its extension that extends on the column portion radially outward section 3B-side. In order to open the molds smoothly, a split angle θ of the parting surface PL with respect to the axis of the bearing is set to 0.3° or more (for example, 1°).

The interval between the balls 4 that are held by the cage 1 and that are next to each other in the circumference direction is shortest at the pitch circle position. Accordingly, the thickness of the column portion radially inward section 3A of the cage 1, which separate the balls 4, arranged next to each other, from each other, also exhibits a minimum value $t_0$ at the pitch circle position (see FIG. 3A). Therefore, if the column portion radially outward section 3B is connected to the column portion radially inward section 3A at a position radially outward of the pitch circle position, a thickness t' of the column portion radially inward section 3A at the connection position is larger than a thickness $t_0$ of the column portion radially inward section 3A at the pitch circle position. The thickness $t_0$ of the column portion radially inward section 3A at the pitch circle position is, for example, from 0.3 mm to 0.6 mm. Also, the thickness t' of the column portion radially inward section 3A at the connection position is from 0.6 mm to 1.0 mm.

Figure 5:
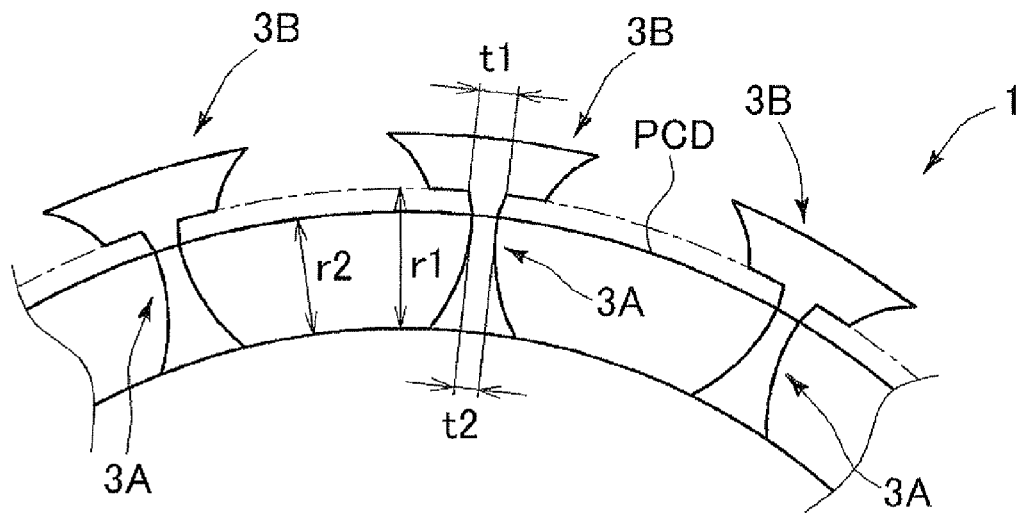
FIG. 5 is an enlarged view showing a main portion of the cage in FIG. 1.

More specifically, as shown in FIG. 5 that is an enlarged view of a main portion of the cage 1 in FIG. 1, if the circumferential dimension of the connection portion at which the column portion radially outward section 3B is connected to the column portion radially inward section 3A is t1, the circumferential dimension of the intersecting portion at which the pitch circle position intersects with the column portion distal end-side section 3Aa is t2, and the radial dimensions from the radially inner surface of the ring portion 2 to the connection portion and the intersection portion are respectively r1 and r2, it is obvious that t1>t2 because r1>r2, and the connection area of the connection portion is larger than the sectional area of the intersecting portion.

Moreover, also in the column portion radially outward section 3B in FIGS. 4A and 4B, the wide-end portion 3Ba is connected to the rib portion 3Bb, at a position radially outward of the pitch circle position. Therefore, as is the case in FIG. 5, the sectional area of the connection portion at which the wide-end portion 3Ba is connected to the rib portion 3Bb is larger than the sectional area of the intersecting portion at which the pitch circle position intersects with the rib portion 3Bb.

If the mold parting line coincides with the pitch circle position, the column portion radially inward section 3A is connected at its thinnest portion to the column radially outward section 3B. This may cause a problem that mechanical strength is not ensured when the balls 4 are inserted in the pockets 5 of the cage 1 or when loads are applied from the balls 4 in the bearing 11 being used. To ensure the mechanical strength of each column portion 3, it is necessary to ensure a thickness of 0.6 mm or more at the thinnest portion at the connection position. However, if the thickness at the thinnest portion is increased, the number of balls 4 that can be disposed with the same pitch circle diameter is limited, which makes it difficult to increase the load carrying capacity.

However, in the configuration according to the invention, the column portion radially inward section 3A is connected to the column portion radially outward section 3B at a position radially outward of the pitch circle position, at which the thickness of the column portion radially inward section 3A is larger than that at the pitch circle position. This makes it possible to increase the connection area between the column portion radially inward section 3A and the column portion radially outward section 3B and increase the mechanical strength of the column portion 3 of the crown-type cage, and makes it difficult to cause breakage of the column portion 3 when the balls 4 are inserted into the pockets 5 of the cage 1 or when loads are applied from the balls 4 in the bearing 11 being used. Furthermore, even if the thickness t of the column portion radially inward section 3A at the pitch circle position is reduced to 0.6 mm or less, the strength of the column portion 3 of the crown-type cage is sufficiently ensured. Therefore, it is possible to increase the number of balls 4 that can be held by the cage with the same pitch circle diameter, which makes it possible to increase the load carrying capacity of the bearing.

The mold 20 that has the mold structure shown in FIG. 6 and is opened in the mold opening manner shown in FIG. 6 is only one example of a mold for implementing the invention. As long as it is possible to form the cage 1 in which the connection position at which the column portion radially inward section 3A is connected to the column portion radially outward section 3B is adjusted to a position radially outward of the pitch circle of the plurality of balls 4 held in the respective pockets 5, any mold structures and mold opening manners may be employed.

The invention relates to a resin crown-type cage that rollably holds a plurality of balls, serving as rolling elements of the angular contact ball bearing, between an inner ring and an outer ring at predetermined intervals. In order to solve the above-described problem, the resin crown-type cage includes a ring portion, and a plurality of column portions that protrude from the ring portion in the axial direction and that are arranged in the circumference direction, wherein the column portions next to each other in the circumference direction form pockets that house the balls serving as the rolling elements. Each of the column portions has a column portion radially inward section that forms a bearing-radial-direction inward side portion of the column portion, and a column portion radially outward section that is connected to the column portion radially inward section at its radially outer end position, so as to protrude on both sides in the circumferential direction from the column portion radially inward section. An inner surface of each of the pockets is formed in a spherical shape that lies astride the column portion radially inward section and the column portion radially outward section. A connection position at which the column portion radially outward section is connected to the column portion radially inward section is adjusted to a position radially outward of a pitch circle of the plurality of the balls that are held in the respective pockets so that the thickness of the column portion radially inward section at the connection position is larger than the thickness of the column portion radially inward section at the pitch circle position.

With the resin cage for an angular contact ball bearing according to the invention, each column portion of the cage is configured such that the connection position at which the column portion radially outward section is connected to the column portion radially inward section so as to protrude on both sides in the circumferential direction from the column portion radially inward section is adjusted to a position radially outward of the pitch circle of the plurality of the balls that are held in the respective pocket. Thus, the column portion radially inward section is connected to the column portion radially outward section at a position radially outward of the pitch circle position, at which the thickness of the column portion radially inward section is larger than that at the pitch circle position. This makes it possible to increase the connection area between the column portion radially inward section and the column portion radially outward section and increase the mechanical strength of the column portion of the crown-type cage, and makes it difficult to cause breakage of the column portion when the balls are inserted into the pockets of the cage or when loads are applied from the balls in the bearing being used.

As a result, even if the thickness t of the column portion radially inward section at the pitch circle position is reduced to 0.6 mm or less, the strength of the column portion of the crown-type cage can be sufficiently ensured. Therefore, even with the same pitch circle diameter, the number of balls that can be held by the cage is increased, which makes it possible to increase the load carrying capacity of the bearing. The lower limit of the thickness t required to ensure the mechanical strength of the column portion is, for example, approximately 0.3 mm.

The ring portion and the column portion radially outward section form a first end-side portion of the radially outer peripheral surface of the column portion, at which the ring portion is located in the axial direction, and the column radially outward section that protrudes radially outward from the first end-side portion forms a second end-side portion that is the remaining section of the outer peripheral surface. Then, a parting surface of the split mold used to form the cage is set to a position radially outward of the pitch circle position such that the parting surface is a tapered surface the diameter of which is smaller on the side on which the ring portion is located than on the opposite side, and such that the parting surface covers the first end-side portion and its extension that extends on the column portion radially outward section-side. By forming the parting surface as the above-described tapered surface, it is possible to smoothly take the resin compact, which will become the cage, out of the molds. In order to open the molds smoothly, a split angle of the parting surface with respect to the axis of the bearing is set to 0.3° or more (the upper limit is, for example, equal to or smaller than 5°).

DESCRIPTION OF THE REFERENCE NUMERALS

1 RESIN CAGE FOR ANGULAR CONTACT BALL BEARING
3 COLUMN PORTION
3A COLUMN PORTION RADIALLY INWARD SECTION
3B COLUMN PORTION RADIALLY OUTWARD SECTION
PCD PITCH CIRCLE DIAMETER
4 BALL
5 POCKET
11 ANGULAR CONTACT BALL BEARING
12, 13 INNER RING AND OUTER RING

The invention claimed is:

1. A resin crown-type cage for an angular contact ball bearing, which rollably holds a plurality of balls, serving as rolling elements of the angular contact ball bearing, between an inner ring and an outer ring at predetermined intervals, comprising:
 a ring portion; and
 a plurality of column portions that protrude from the ring portion in an axial direction and that are arranged in a circumference direction, wherein the column portions next to each other in the circumference direction form pockets that house the balls serving as the rolling elements,
 wherein each of the column portions has a column portion radially inward section that forms a bearing-radial-direction inward side portion of the column portion, and a column portion radially outward section that is connected to the column portion radially inward section at a radially outer end position of the column portion radially inward section, so as to protrude on both sides in the circumferential direction from the column portion radially inward section,
 wherein an inner surface of each of the pockets is formed in a spherical shape that lies astride the column portion radially inward section and the column portion radially outward section, and
 wherein a connection position at which the column portion radially outward section is connected to the column portion radially inward section is adjusted to a position radially outward of a pitch circle of the plurality of the balls that are held in the respective pockets so that a thickness of the column portion radially inward section at the connection position is larger than a thickness of the column portion radially inward section at the pitch circle position.

2. The resin cage for an angular contact ball bearing according to claim 1 wherein the thickness of the column portion radially inward section at the pitch circle position is adjusted to a value equal to or larger than 0.3 mm and equal to or smaller than 0.6 mm.

3. The resin cage for an angular contact ball bearing according to claim 1,
 wherein the ring portion and the column portion radially outward section form a first end-side portion of a radially outer peripheral surface of the column portion, at which the ring portion is located in the axial direction, and the column radially outward section that protrudes radially outward from the first end-side portion forms a second end-side portion that is a remaining section of the outer peripheral surface, and
 wherein a parting surface of split mold used to form the cage is set to a position radially outward of the pitch circle position such that the parting surface is a tapered surface a diameter of which is smaller on a side on which the ring portion is located than on an opposite side, and such that the parting surface covers the first end-side portion and an extension of the first end-side portion, which extends on the column portion radially outward section-side.

4. The resin cage for an angular contact ball bearing according to claim 3 wherein a split angle of the parting surface with respect to an axis of the bearing is set to a value equal to or larger than 0.3° and equal to or smaller than 5°.

* * * * *